US012764438B2

(12) United States Patent
Lim

(10) Patent No.: US 12,764,438 B2
(45) Date of Patent: Oct. 13, 2026

(54) BJT PIXEL CIRCUIT, IMAGE SENSOR INCLUDING THE SAME AND OPERATING METHOD THEREOF

(71) Applicant: PIXART IMAGING INC., Hsin-Chu County (TW)

(72) Inventor: Wooi-Kip Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 61 days.

(21) Appl. No.: 19/054,921

(22) Filed: Feb. 17, 2025

(65) Prior Publication Data

US 2026/0247048 A1 Aug. 20, 2026

(51) Int. Cl.

*H04N 25/771* (2023.01)
*H04N 23/71* (2023.01)
*H04N 23/73* (2023.01)
*H04N 23/74* (2023.01)
*H04N 25/53* (2023.01)

(52) U.S. Cl.

CPC ........... *H04N 25/771* (2023.01); *H04N 23/71* (2023.01); *H04N 23/73* (2023.01); *H04N 23/74* (2023.01); *H04N 25/53* (2023.01)

(58) Field of Classification Search

CPC ...... H04N 25/771; H04N 23/71; H04N 23/73; H04N 23/74; H04N 25/53
USPC ........................................................ 348/297
See application file for complete search history.

(56) References Cited

U.S. PATENT DOCUMENTS

2015/0042566 A1* 2/2015 Lim ...................... G06F 3/0304 250/214 R
2022/0068993 A1* 3/2022 Lim ...................... H04N 23/73

* cited by examiner

*Primary Examiner* — Lin Ye
*Assistant Examiner* — Chan T Nguyen
(74) *Attorney, Agent, or Firm* — HAUPTMAN HAM, LLP

(57) ABSTRACT

There is provided an image sensor including a BJT pixel circuit and a light source. The BJT pixel circuit adopts a reset settling time of a base-emitter voltage of a bipolar junction transistor before the light source is turned on to illuminate light. The light source provides light energy to the BJT pixel circuit within a pre-flash time and an exposure time. The reset settling time, the pre-flash time and the exposure time are changed with light energy detected by the BJT pixel circuit with a negative relationship.

20 Claims, 7 Drawing Sheets

| | FIG.4 time (μs) | | FIG.5 time (μs) | |
|---|---|---|---|---|
| | weak | strong | weak | strong |
| exposure time | 6.29 | 2.94 | 5.68 | 2.41 |
| settling time | 7.50 | 7.50 | 5.35 | 2.00 |
| pre-flash time | 2.00 | 2.00 | 1.00 | 0.80 |
| LED ON time | 8.29 | 4.94 | 6.68 | 3.21 |
| pixel activate time | 13.79 | 10.44 | 11.03 | 4.41 |

FIG. 6

BJT PIXEL CIRCUIT, IMAGE SENSOR INCLUDING THE SAME AND OPERATING METHOD THEREOF

FIELD OF THE DISCLOSURE

This disclosure generally relates to a bipolar junction transistor (BJT) pixel circuit and, more particularly, to a BJT pixel circuit that shortens a reset voltage settling time, a pre-flash time and an exposure time according to detected light intensity, and an image sensor including the BJT pixel circuit and an operating method thereof.

BACKGROUND OF THE DISCLOSURE

The BJT pixel circuit is one kind of pixel circuit applied to an optical image sensor. FIG. 1 is a circuit diagram of a pixel circuit 9 of a conventional optical image sensor. The pixel circuit 9 includes a feedback amplifier circuit 91, a bipolar junction transistor 93, a photodiode 95, a shutter circuit 97 and a storage capacitor 99, wherein the storage capacitor 99 is used to store detected light energy of the photodiode 95.

Please refer to FIG. 2, it is an operational timing diagram of the pixel circuit 9 in FIG. 1. At the beginning of every frame, a light source control signal LS turns on a light source to cause the photodiode 95 to receive light energy. The photodiode 95 generates a base current IB according to intensity of received light energy. Between time points TA and TB, the feedback amplifier circuit 91 establishes a emitter-base voltage VBE of the bipolar junction transistor 93 to increase the beta of the bipolar junction transistor 93 to a stable level, wherein the beta is the ratio between a collector current IC and the base current IB of the bipolar junction transistor 93. At time point TB, the bipolar junction transistor 93 operates with a stable beta and generates a stable emitter current IE. When the shutter circuit 97 is triggered by a shutter control signal SHUTTER, the storage capacitor 99 discharges via the emitter current IE to decrease a voltage VSC across the storage capacitor 99.

In FIG. 2, the time interval required from the light source being turned on (e.g., time point TA) to the time the bipolar junction transistor 93 obtaining a stable beta (e.g., time point TB) is defined as a pre-flash time (e.g., shown as 200 μs) of the BJT pixel circuit 9. The time interval during which the shutter control signal SHUTTER is triggered is defined as an exposure time (e.g., shown as 10 μs).

In addition, before the begging of every frame, the emitter-base voltage VBE should be reset, and thus a reset settling time is further required after the emitter-base voltage VBE being reset till the light source being turned on. The reset settling time, the pre-flash time and the exposure time form a pixel activation time. The longer the pixel activation time is, the power consumption of the optical image sensor is higher.

The information disclosed in this BACKGROUND is merely intended to increase understanding of the general background of the invention and should not be taken as an admission or in any way implied that the relevant information constitutes prior art that is already known to a person of ordinary skill in the art.

SUMMARY

Accordingly, the present disclosure provides a BJT pixel circuit that shortens a reset settling time of emitter-base voltage VBE, a pre-flash time and an exposure time according to detected light intensity, and an image sensor including the BJT pixel circuit and an operating method thereof.

The present disclosure provides a BJT pixel circuit including a bipolar junction transistor, a reset transistor and a photodiode. The bipolar junction transistor has a base and a collector. The reset transistor is connected between the base and the collector of the bipolar junction transistor, and configured to reset a base-emitter voltage of the bipolar junction transistor at a first time. The photodiode is connected between the base and the collector of the bipolar junction transistor, and configured to receive pre-flash energy at a second time behind the first time to increase a beta of the bipolar junction transistor to a stable level. A settling time between the first time and the second time is changed corresponding to light energy detected by the photodiode.

The present disclosure further provides an image sensor including a light source and multiple pixel circuits. Each of the multiple pixel circuits includes a bipolar junction transistor, a reset transistor and a photodiode. Each pixel circuit is configured to in a first frame period, after a first settling time from resetting a base-emitter voltage of the bipolar junction transistor by the reset transistor, detect first pre-flash energy of the light source by the photodiode within a first pre-flash time to increase a beta of the bipolar junction transistor to a first stable level, and in a second frame period, after a second settling time from resetting the base-emitter voltage by the reset transistor, detect second pre-flash energy of the light source by the photodiode within a second pre-flash time to increase the beta of the bipolar junction transistor to a second stable level. The first settling time is different from the second settling time, and the first pre-flash time is different from the second pre-flash time.

The present disclosure further provides an operating method of an image sensor. The image sensor includes a BJT pixel circuit and a light source. The operating method includes the steps of: resetting, using a base reset signal, a base-emitter voltage of a bipolar junction transistor of the BJT pixel circuit at a first time; and turning on, using a light source control signal, the light source for a pre-flash time at a second time to increase a beta of the bipolar junction transistor to a stable level. The pre-flash time and a settling time of the base-emitter voltage between the first time and the second time are changed corresponding to light energy detected by the BJT pixel circuit.

BRIEF DESCRIPTION OF DRAWINGS

Other objects, advantages, and novel features of the present disclosure will become more apparent from the following detailed description when taken in conjunction with the accompanying drawings.

FIG. 6 is a schematic diagram of operating time intervals when the BJT pixel circuit of an image sensor of the present disclosure detects different light energy.

DETAILED DESCRIPTION OF THE DISCLOSURE

It should be noted that, wherever possible, the same reference numbers will be used throughout the drawings to refer to the same or like parts.

One objective of the present disclosure is to provide a bipolar junction transistor (BJT) pixel circuit that dynamically adjust a settling time of a base-emitter voltage (VBE), a pre-flash time and an exposure time of the BJT pixel circuit according to detected light intensity, and an image sensor including the BJT pixel circuit and an operating method thereof to decrease activation times of the BJT pixel circuit and a light source to reduce total power consumption of the image sensor.

Figure 1:
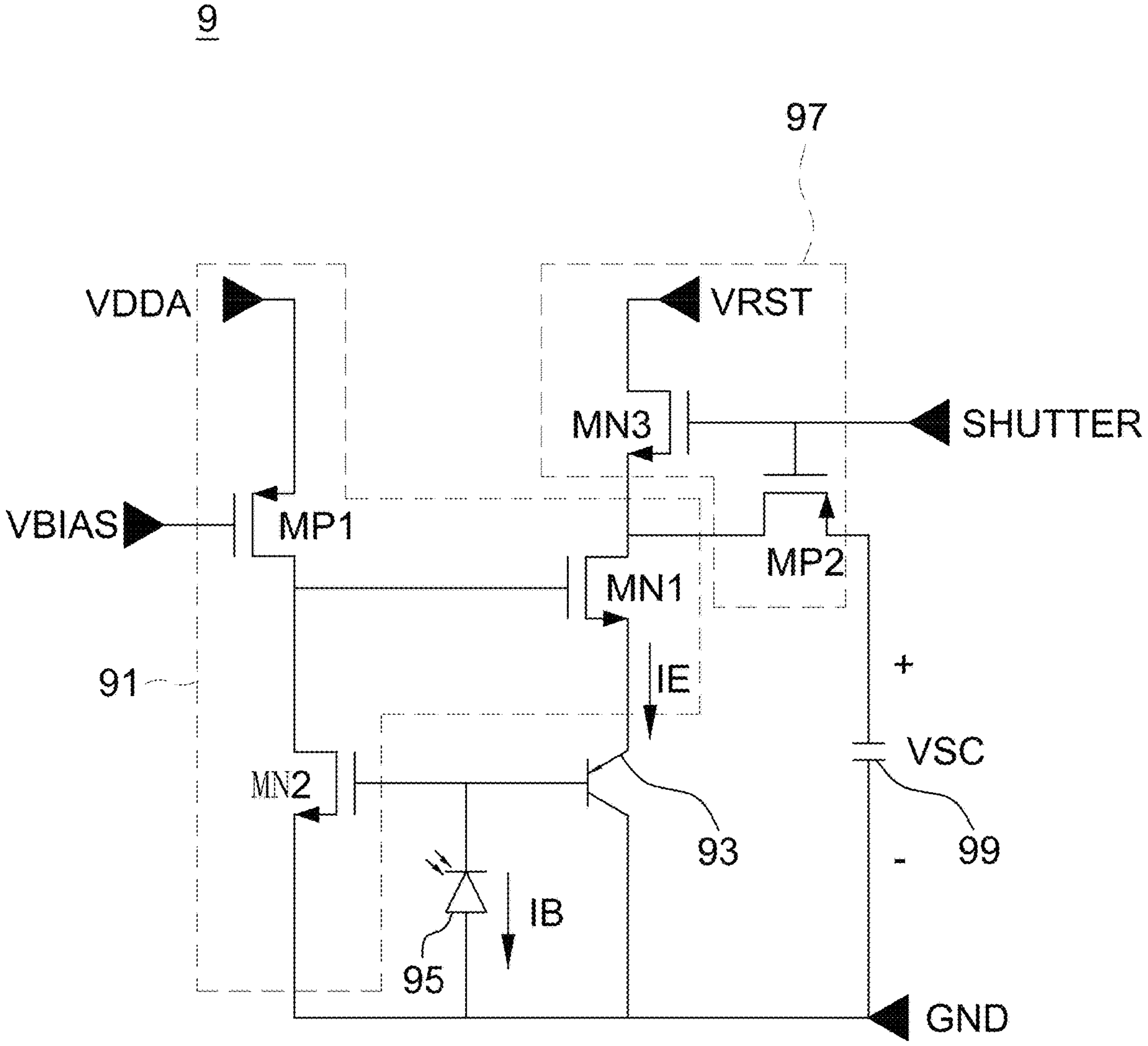
FIG. 1 (Prior Art)
FIG. 1 is a circuit diagram of a conventional BJT pixel circuit.
Figure 2:
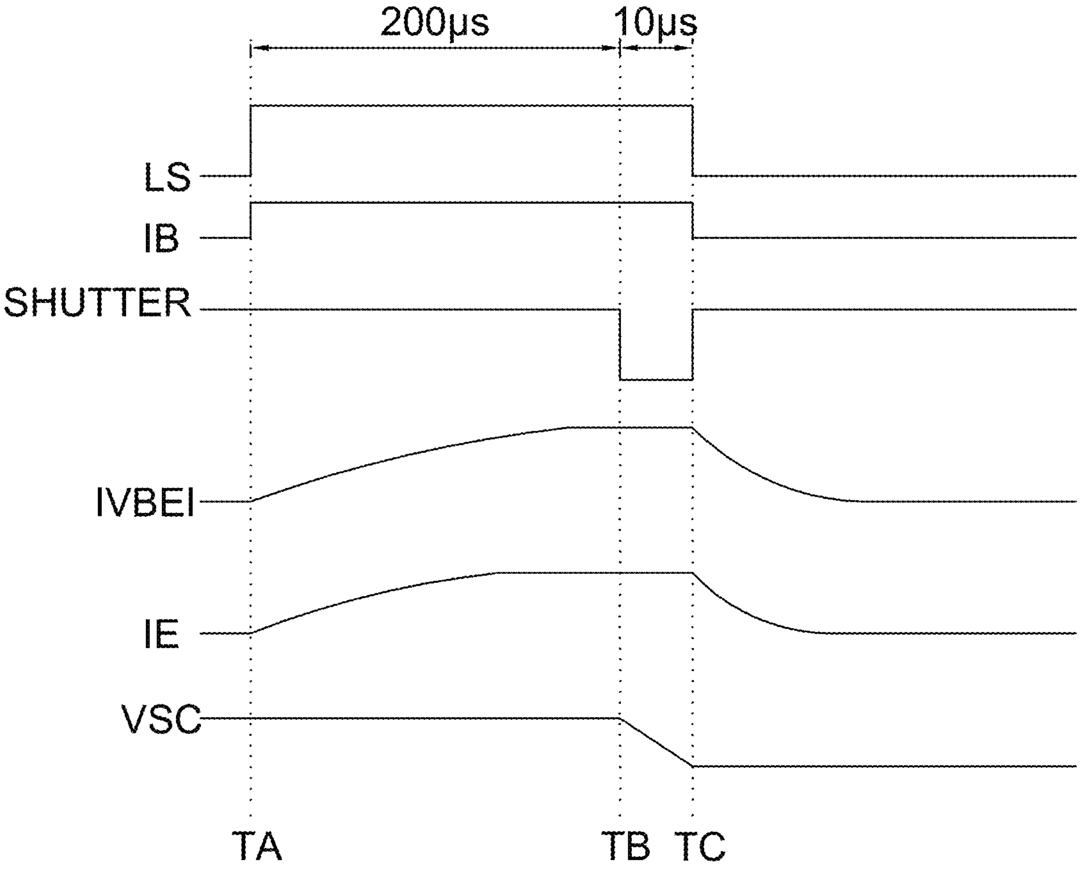
FIG. 2 (Prior Art)
FIG. 2 is an operational timing diagram of the BJT pixel circuit in FIG. 1.
Figure 3:
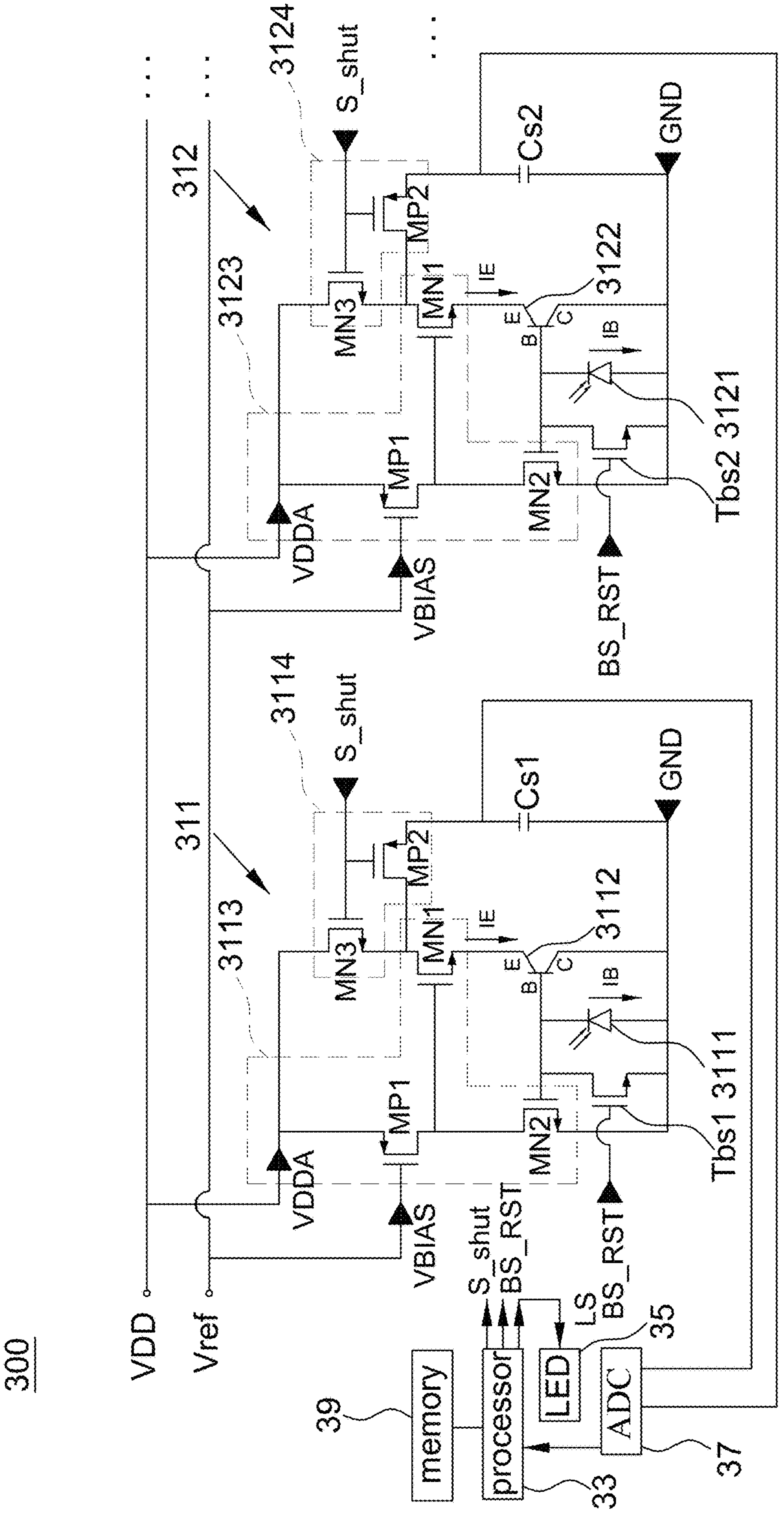
FIG. 3 is a schematic diagram of an image sensor according to one embodiment of the present disclosure.

Please refer to FIG. 3, it is a schematic diagram of an image sensor 300 according to one embodiment of the present disclosure. The image sensor 300 includes a first pixel circuit 311, a second pixel circuit 312, a processor 33, a light source 35, an analog to digital converter (ADC) 37 and a memory 39. For illustration purposes, the ADC 37 and the memory 39 are shown to be outside of the processor 33. In other aspects, the ADC 37 and the memory 39 are embedded in the processor 33, e.g., in a sensor chip together. The first pixel circuit 311 and the second pixel circuit 312 are two adjacent pixels of a pixel array of the image sensor 300. FIG. 3 omits other pixels of the pixel array.

The memory 39 includes a volatile memory and/or a non-volatile memory, and records at least information of adjusting a settling time, e.g., recording a relationship between multiple predetermined light energy zones and multiple predetermined settling times.

The processor 33 is, for example, an application specific integrated circuit (ASIC), a micro controller unit (MCC), a field programmable gate array (FPGA) or a digital signal processor (DSP). The processor 33 outputs control signals, e.g., including a base rest signal BS_RST and a shutter control signal S_shut to control operations of each pixel circuit, and generates a light source control signal LS to control ON/OFF of the light source 35, e.g., referring to FIGS. 4-5. The processor 33 further accesses the relationship in the memory 39 to determine the required settling time, mentioned below by examples. The processor 33 implements functions thereof using software, firmware and/or hardware.

The first pixel circuit 311 includes a photodiode 3111, a bipolar junction transistor 3112, a feedback amplifier circuit 3113, a shutter circuit 3114, a storage capacitor Cs1 and a reset transistor Tbs1 (shown as NMOS transistor). The storage capacitor Cs1 is used to record pixel data detected by the first pixel circuit 311 within an exposure time.

The second pixel circuit 312 includes a photodiode 3121, a bipolar junction transistor 3122, a feedback amplifier circuit 3123, a shutter circuit 3124, a storage capacitor Cs2 and a reset transistor Tbs2 (shown as NMOS transistor). The storage capacitor Cs2 is used to record pixel data detected by the second pixel circuit 312 within an exposure time.

The photodiodes 3111 and 3121 are used to detect light energy when the light source 35 is turned on by the light source control signal LS. For example, when the image sensor 300 is applied to an optical mouse, the light source 35 is used to illuminate a work surface and the photodiodes 3111 and 3121 are used to receive reflected light from the work surface. The type of the work surface is determined according to an application of the image sensor 300 without particular limitations.

The feedback amplifier circuits 3113 and 3123 respectively include a PMOS transistor MP1 and NMOS transistors MN1 and MN2.

The shutter circuits 3114 and 3124 respectively include a PMOS transistor MP2 and a NMOS transistor MN3.

A source of the PMOS transistor MP1 is coupled to a voltage source VDD to receive an operation voltage VDDA. A drain of the PMOS transistor MP1 is coupled to a gate of MN1 and a drain of MN2. A gate of the PMOS transistor MP1 is coupled to a bias voltage source Vref to receive a bias voltage VBIAS. A gate of the NMOS transistor MN2 is coupled to a base B of the bipolar junction transistors 3112 and 3122 and a cathode of the photodiodes 3111 and 3121. A source of the NMOS transistor MN2 is coupled to a collector C of the bipolar junction transistors 3112 and 3122 and an anode of the photodiodes 3111 and 3121 and coupled to ground GND. A source of the NMOS transistor MN1 is coupled to an emitter E of the bipolar junction transistors 3112 and 3122. A drain of the NMOS transistor MN1 is coupled to a drain of MP2 and a source of MN3 in the shutter circuits 3114 and 3124. A drain of the NMOS transistor MN3 is coupled to the voltage source VDD to receive a voltage provided therefrom in a pre-flash time. A gate of the NMOS transistor MN3 is coupled to a gate of MP2. A source of the PMOS transistor MP2 is coupled to a first end of storage capacitors Cs1 and Cs2. A second end of the storage capacitors Cs1 and Cs2 is coupled to ground GND. A gate of the NMOS transistor MN3 and a gate of the PMOS transistor MP2 are coupled to a shutter end to receive the shutter control signal S_shut, and optionally provide a discharging path of the storage capacitors Cs1 and Cs2 for the storage capacitors Cs1 and Cs2 to discharge via an emitter current IE. The shutter control signal S_shut controls exposure times of the photodiodes 3111 and 3121.

The reset transistors Tbs1 and Tbs2 and the photodiodes 3111 and 3121 are respectively connected between bases B and collectors C of the bipolar junction transistors 3112 and 3122. The gates of the reset transistors Tbs1 and Tbs2 receive the base reset signal BR_RST to reset the base-emitter voltage VBE.

Figure 4:
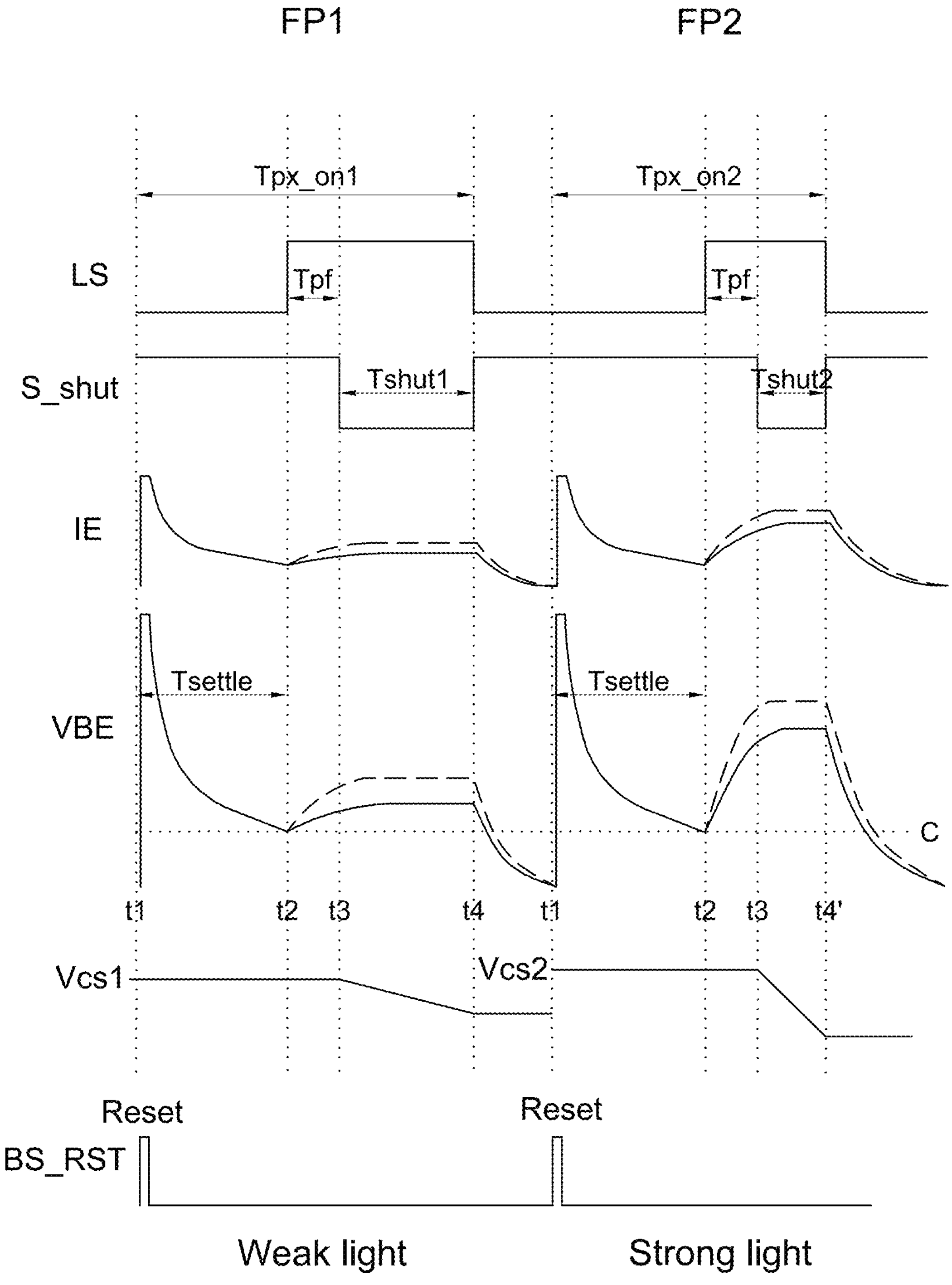
FIG. 4 is an operational timing diagram of a light source and BJT pixel circuits of an image sensor in FIG. 3 according to a first embodiment of the present disclosure.

Please refer to FIG. 4, it is an operational timing diagram of a light source and BJT pixel circuits (e.g., including 311 and 312) of an image sensor 300 in FIG. 3 according to a first embodiment of the present disclosure. FIG. 4 shows an operational timing diagram of two frame periods FP1 and FP2, and each frame period is shown as an activation time Tpx_on1 and Tpx_on2 of the pixel circuits.

For simplification purposes, the BJT pixel circuit is sometimes abbreviated as a pixel circuit herein.

Before the beginning of each image frame (e.g., referred to a current image frame), the processor 33 generates, at a first time t1, a base reset signal BR_RST to reset a base-emitter voltage VBE of the bipolar junction transistors 3112 and 3122. That is, when the base reset signal BS_RST is “1”, a large base current IB is generated to rest VBE to eliminate the VBE information of a previous image frame. Next, the base-emitter voltage VBE is settled to a voltage C till the light source 35 being turning on (according to the light source control signal sent from the processor 33) at a second time t2, e.g., a settling time Tsettle being shown between the first time t1 and the second time t2. In the first embodiment, the settled voltage C of the base-emitter voltage VBE of every frame periods of the image sensor 300 are identical, and the settled voltage C is arranged as the worst case that the pixel circuit can detect light energy.

A time interval between the second time t2 and a third time t3 is referred to a pre-flash time (e.g., shown as Tpf), which is used to increase a beta of the bipolar junction transistors 3112 and 3122 to a stable level, which is positively related to light intensity illuminating the pixel circuits 311 and 312. The definition of the beta is known to the art, and thus is not described herein.

The processor 33 then sends a shutter control signal S_shut at the third time t3 to expose the pixel circuits 311 and 312, e.g., shown as exposure times Tshut1 and Thut2. In the exposure times Tshut1 and Thut2, voltages Vcs1 and Vcs2 on the storage capacitors Cs1 and Cs2 are discharged according to light energy received by the photodiodes 3111 and 3121, e.g., discharging via emitting current IE. At times t4 and t4', the exposure times are over.

In the first embodiment, the settling times Tsettle and pre-flash times Tpf of every frame periods of the image sensor 300 are all identical, e.g., FIG. 6 showing that the settling time Tsettle and pre-flash time Tpf are respectively 7.5 μs and 2 μs no matter in strong illuminating light or weak illuminating light. Solid lines and dash lines of the emitter current IE and the base-emitter voltage VBE represent values corresponding to different light intensity (e.g., different reflectivity of work surface). When the light intensity is higher, the stable voltage of the base-emitter voltage VBE is higher.

The activation time Tpx_on1 of the pixel circuit 311 is a summation of the settling time Tsettle, the pre-flash time Tpf and the exposure time Tshut1. The activation time Tpx_on2 of the pixel circuit 312 is a summation of the settling time Tsettle, the pre-flash time Tpf and the exposure time Tshut2.

Figure 5:
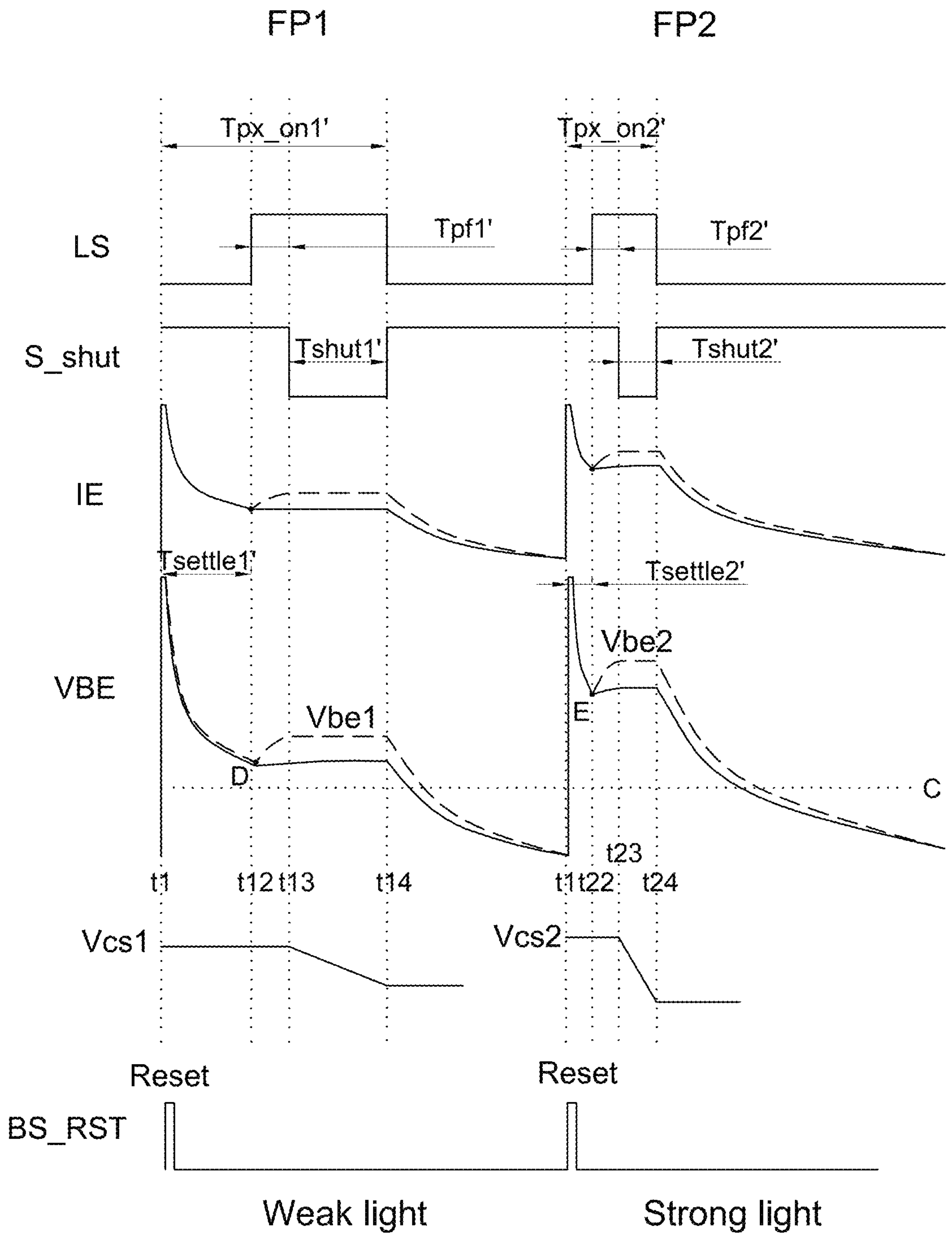
FIG. 5 is an operational timing diagram of a light source and BJT pixel circuits of an image sensor in FIG. 3 according to a second embodiment of the present disclosure.

Please refer to FIG. 5, it is an operational timing diagram of a light source and BJT pixel circuits (e.g., including 311 and 312) of an image sensor 300 in FIG. 3 according to a second embodiment of the present disclosure. FIG. 5 also shows an operational timing diagram of two frame periods FP1 and FP2, and each frame period is an activation time Tpx_on1 and Tpx_on2 of the pixel circuits. Similarly, an activation time Tpx_on1' is a summation of a settling time Tsettle1', a pre-flash time Tpf1' and an exposure time Tshut1'; and an activation time Tpx_on2' is a summation of a settling time Tsettle2', a pre-flash time Tpf2' and an exposure time Tshut2'.

Similarly, solid lines and dash lines of the emitter current IE and the base-emitter voltage VBE in FIG. 5 represent values corresponding to different light intensity.

The BJT pixel circuit 311 is taken as an example herein for illustration, and operations of other pixel circuits of the pixel array of the image sensor 300 are understood after understanding the operation of the BJT pixel circuit 311.

Before the beginning of each image frame (e.g., referred to a current image frame), the reset transistor Tsb1 resets (according to the base reset signal BS_RST) a base-emitter voltage VBE of the bipolar junction transistor 311 at a first time t1. Next, the photodiode 3111 receives pre-flash energy at a second time t12 behind the first time t1 (i.e. light source 35 being turned on at the second time t12 by the light source signal LS) to increase a beta of the bipolar junction transistor 3112 to a stable level. As mentioned above, the feedback amplifier circuit 3113 is used to establish the base-emitter voltage VBE within a pre-flash time Tpf1' during which the photodiode 3111 is receiving the pre-flash energy so as to increase the beta to the stable level, which is positively related to light intensity illuminating the first pixel circuit 311. Next, the shutter circuit 3114 triggers (according to the shutter control signal S_shut) an exposure time Tshut1' of the first pixel circuit 311 at a third time t13 behind the second time t12 so as to discharge the storage capacitor Cs1, e.g., the discharging being shown between t13 to t14 in FIG. 5.

In the second embodiment, a settling time Tsettle1' between the first time t1 and the second time t12 is changed corresponding to light energy receive by the photodiode 311. In one aspect, the light energy is detected by the photodiode 311 of the first pixel circuit 311 within an exposure time of a previous image frame (previous to the current image frame). For example, the processor 33 identifies the light energy according to pixel data outputted by the ADC 37 in said previous image frame, and the pixel data is read from the storage capacitor Cs1 of the first pixel circuit 311. In one aspect, the memory 39 records a relationship between multiple predetermined light energy zones and multiple predetermined settling times, and the processor 33 determines the settling time Tsettle1' according to the relationship. The processor 33 may directly adjust the settling time Tsettle1' to a value corresponding to the light energy, or changes (increasing or decreasing) the settling time Tsettle1' in a step manner according to the light energy.

For example, in said previous image frame, the first pixel circuit 311 uses a default settling time (e.g., Tsettle in FIG. 4) to cause the base-emitter voltage VBE to reduce to a default voltage C, wherein the default settling time Tsettle is larger than the settling time Tsettle1', e.g., FIG. 6 showing a settling time 5.35 μs smaller than 7.5 μs.

In the second embodiment, because the settling time Tsettle1' is shortened, the base-emitter voltage VBE reduces, at the second time t12, to the voltage D, which is changed corresponding to light energy (detected in the exposure time of previous image frame) received by the photodiode 3111. When the light energy is stronger, the settling time Tsettle1' is shorter and the voltage D is larger (e.g., referring to the frame period FP2); whereas when the light energy is weaker, the settling time Tsettle1' is longer and the voltage D is smaller. Preferably, Tsettle1' is not larger than Tsettle as shown in FIG. 4 and the voltage D is not lower than the voltage C as shown in FIG. 4 to achieve the purpose of saving power.

Meanwhile, the pre-flash time Tpf1' and the exposure time Tshut1' are changed with the settling time Tsettle1' with a positive relationship. That is, when the settling time Tsettle1' is shortened, the pre-flash time Tpf1' and the exposure time Tshut1' are shortened with the same ratio. Preferably, the pre-flash time Tpf1' and the exposure time Tshut1' are not longer than Tpf and Tshut1 as shown in FIG. 4, respectively.

Please refer to FIG. 5 again, each of multiple pixel circuits (e.g., also taking 311 as an example) of the image sensor 300 is used to, in a first frame period (e.g., FP1), after a first settling time Tsettle1' from resetting (according to the base reset signal BR_RST) a base-emitter voltage VBE of the bipolar junction transistor 3112 by the reset transistor Tbs1, detect first pre-flash energy of the light source 35 by the photodiode 3111 within a first pre-flash time Tpf1' to increase a beta of the bipolar junction transistor 3112 to a first stable level Vbe1; and in a second frame period (e.g., FP2), after a second settling time Tsettle2' from resetting the base-emitter voltage VBE by the reset transistor Tbs2, detect second pre-flash energy of the light source 35 by the photodiode 3111 within a second pre-flash time Tpf2' to increase the beta of the bipolar junction transistor 3112 to a second stable level Vbe2.

In the second embodiment, the first settling time Tsettle1' is different from the second settling time Tsettle2', and the first pre-flash time Tpf1' is different from the second pre-flash time Tpf2'. For example, when the first settling time Tsettle1' is longer than the second settling time Tsettle2', the first pre-flash time Tpf1' is longer than the second pre-flash time Tpf2'; and when the first settling time Tsettle1' is shorter than the second settling time Tsettle2', the first pre-flash time Tpf1' is shorter than the second pre-flash time Tpf2'.

Furthermore, each of the multiple pixel circuits of the image sensor 300 further, in the first frame period FP1, detects first light energy of the light source 35 by the photodiode 3111 within a first exposure time Tshut1'; and in the second frame period FP2, detects second light energy of the light source 35 by the photodiode 3111 within a second exposure time Tshut2'. When the first settling time Tsettle1' is longer than the second settling time Tsettle2', the first exposure time Tshut1' is longer than the second exposure time Tshut2'; and when the first settling time Tsettle1' is shorter than the second settling time Tsettle2', the first exposure time Tshut1' is shorter than the second exposure time Tshut2'.

For example, the first frame period FP1 is prior to (a direct previous one) the second frame period FP2. The second settling time Tsettle2' is determined according to the first light energy. For example, the processor 33 determines the second settling time Tsettle2' according to the first light energy and the relationship in the memory 39.

In addition, each of the multiple pixel circuits of the image sensor 300 further, in an initial frame period (e.g., the one directly previous to FP1), after a default settling time (e.g., Tsettle in FIG. 4) from resetting the base-emitter voltage VBE by the reset transistor Tbs1, detects pre-flash energy of the light source 35 by the photodiode 3111 within a default pre-flash time (e.g., Tpf in FIG. 4) to increase the beta of the bipolar junction transistor 3112 to a stable level, as shown in FIG. 4.

Preferably, the default settling time Tsettle is longer than the first settling time Tsettle1', and the default pre-flash time Tpf is longer than the first pre-flash time Tpf1' to shorten the pixel activation time Tpx_on1'.

Please refer to FIG. 5 again, an operating method of an image sensor 300 in the second embodiment includes the steps of: resetting, using a base reset signal BR_RST, a base-emitter voltage VBE of a bipolar junction transistor 3112 and 3122 of the BJT pixel circuit 311 and 312 at a first time t1 by the processor 33; turning on, using a light source control signal LS, the light source 35 for a pre-flash time Tpf1' and Tpf2' at a second time t12 and t22 to increase a beta of the bipolar junction transistor 3112 and 3122 to a stable level by the processor 33; and triggering an exposure time Tshut1' and Tshut2' of the BJT pixel circuit 311 and 312 by the shutter circuit 3114 and 3124 at a third time t13 and t23 to discharge the storage capacitor Cs1 and Cs2 by the processor 33. At times t14 and t24, the exposure times Tshut1' and Tshut2' are over.

The pre-flash times Tpf1' and Tpf2' and settling times Tsettle1' and Tsettle2' of the base-emitter voltage VBE between the first time and the second time are changed corresponding to light energy detected by the BJT pixel circuits 311 and 312. As mentioned above, the light energy is detected in an exposure time of a previous image frame (not limited to the direct previous one) of the BJT pixel circuits 311 and 312. The exposure times Tshut1' and Tshut2' are changed with the changing of the settling time Tsettle1' and Tsettle2' with a positive relationship.

The operations of other components in the BJT pixel circuits 311 and 312, instead of the reset transistors Tbs1 and Tbs2, may be referred to U.S. patent application Ser. No. 13/961,091, entitled "BIPOLAR JUNCTION TRANSISTOR PIXEL CIRCUIT, DRIVING METHOD THEREOF, AND IMAGE SENSOR" filed on Aug. 7, 2013, assigned to the same assignee of the present application, and the full disclosure of which is incorporated herein by reference.

As shown in FIG. 6, the pixel activation time of the pixel circuit in the second embodiment (e.g., referring to FIG. 5) is shorter than the pixel activation time of the pixel circuit in the first embodiment (e.g., referring to FIG. 4) such that the power consumption of the image sensor 300 is reduced.

Figure 7:
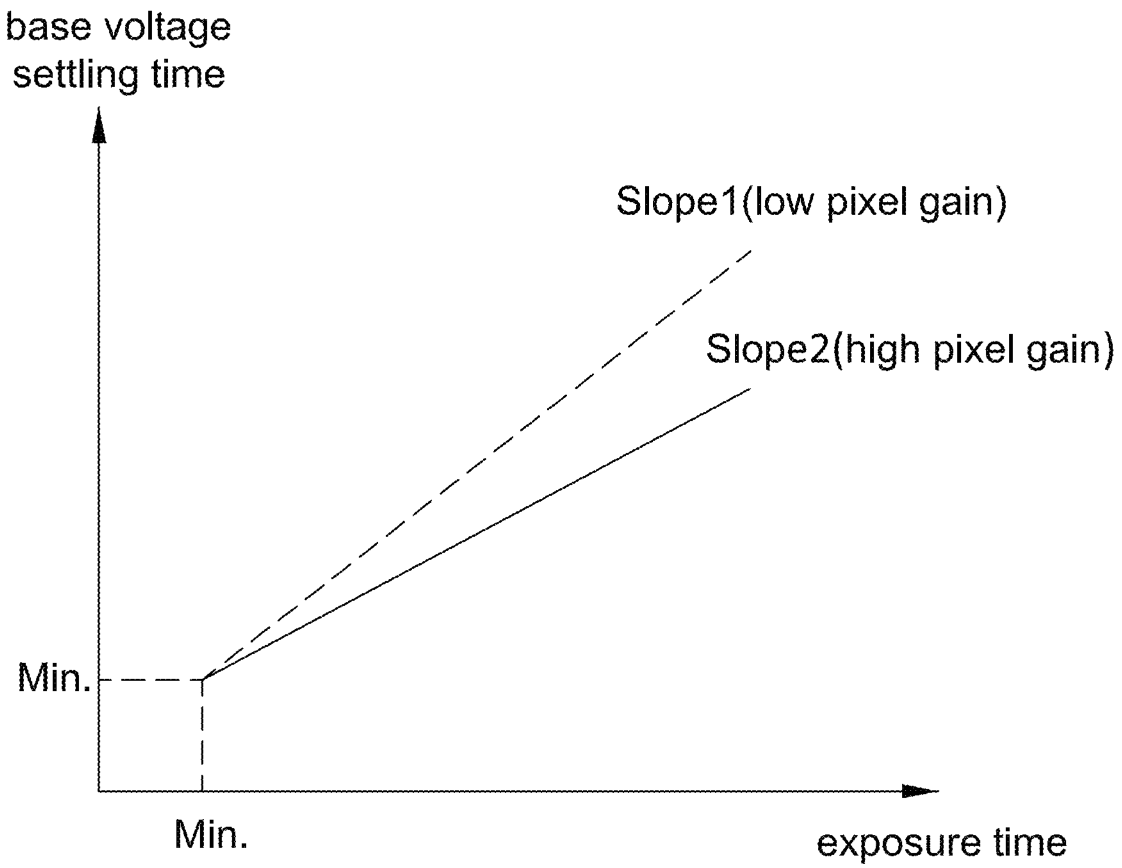
FIG. 7 is a relationship between the base voltage settling time and the exposure time of the BJT pixel circuit according to one embodiment of the present disclosure.

In addition, as shown in FIG. 7, the relationship between the exposure time and the base voltage settling time is associated with the pixel gain. For example, higher sensor gain may cause the shutter more sensitive to light. With the same amount of light change, higher sensor gain setting may have more shutter change so a less steep Slope2 is used to balance back the difference. The minimum of the base reset settling time is arranged based on the maximum VBE of the BJT pixel circuit during the minimum shutter time.

It is appreciated that the image sensor includes a readout circuit 300 to read a voltage across storage capacitors of multiple BJT pixel circuits.

It should be mentioned that the values, e.g., every time interval in FIG. 6 and slopes in FIG. 7, mentioned in the present disclosure are only intended to illustrate but not to limit the present disclosure.

In the present disclosure, the pixel activation times of a pixel array of the image sensor 300 are different in different frame periods to have different power consumption. Under operable light intensity, the variable pixel activation times are lower than a default frame period (e.g., in FIG. 4) such that the power consumption is effectively reduced.

As mentioned above, in optical image sensors, the activation times of a light source and pixel circuits can directly affect the total power consumption. Accordingly, the present disclosure further provides a BJT pixel circuit and an image sensor including the BJT pixel circuit (e.g., FIG. 3) that shorten a settling time of resetting a base-emitter voltage, a pre-flash time and an exposure time of a light source, and an operating time of the image sensor (e.g., FIGS. 4-5). The stable level of the base-emitter voltage VBE is adjusted according to light intensity detected by the BJT pixel circuit to a level as close as possible to an actual VBE level needed.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A pixel circuit, comprising:

a bipolar junction transistor, having a base and a collector;

a reset transistor, connected between the base and the collector of the bipolar junction transistor, and configured to reset a base-emitter voltage of the bipolar junction transistor at a first time; and a photodiode, connected between the base and the collector of the bipolar junction transistor, and configured to receive pre-flash energy at a second time behind the first time to increase a beta of the bipolar junction transistor to a stable level, wherein a settling time between the first time and the second time is changed corresponding to light energy detected by the photodiode.

2. The pixel circuit as claimed in claim 1, further comprising a feedback amplifier circuit configured to establish the base-emitter voltage during a pre-flash time that the photodiode is receiving the pre-flash energy to increase the beta to the stable level, wherein the pre-flash time is changed with the changing of the settling time with a positive relationship.

3. The pixel circuit as claimed in claim 1, further comprising:

a storage capacitor, configured to record pixel data of the pixel circuit; and a shutter circuit, configured to trigger an exposure time of the pixel circuit at a third time behind the second time to discharge the storage capacitor.

4. The pixel circuit as claimed in claim 3, wherein the exposure time is changed with the changing of the settling time with a positive relationship.

5. The pixel circuit as claimed in claim 1, wherein the light energy is detected by the photodiode of the pixel circuit within an exposure time of a previous image frame.

6. The pixel circuit as claimed in claim 5, wherein the settling time is shorter when the light energy in the previous image frame is stronger, and the settling time is longer when the light energy in the previous image frame is weaker.

7. The pixel circuit as claimed in claim 6, wherein in the previous frame, the pixel circuit uses a default settling time, which is longer than the settling time.

8. An image sensor, comprising:

a light source; and multiple pixel circuits each comprising a bipolar junction transistor, a reset transistor and a photodiode, and each pixel circuit configured to in a first frame period, after a first settling time from resetting a base-emitter voltage of the bipolar junction transistor by the reset transistor, detect first pre-flash energy of the light source by the photodiode within a first pre-flash time to increase a beta of the bipolar junction transistor to a first stable level, and in a second frame period, after a second settling time from resetting the base-emitter voltage by the reset transistor, detect second pre-flash energy of the light source by the photodiode within a second pre-flash time to increase the beta of the bipolar junction transistor to a second stable level, wherein the first settling time is different from the second settling time, and the first pre-flash time is different from the second pre-flash time.

9. The image sensor as claimed in claim 8, wherein when the first settling time is longer than the second settling time, the first pre-flash time is longer than the second pre-flash time, and when the first settling time is shorter than the second settling time, the first pre-flash time is shorter than the second pre-flash time.

10. The image sensor as claimed in claim 8, wherein the each pixel circuit is further configured to in the first frame period, detect first light energy of the light source by the photodiode within a first exposure time, and in the second frame period, detect second light energy of the light source by the photodiode within a second exposure time.

11. The image sensor as claimed in claim 10, wherein when the first settling time is longer than the second settling time, the first exposure time is longer than the second exposure time, and when the first settling time is shorter than the second settling time, the first exposure time is shorter than the second exposure time.

12. The image sensor as claimed in claim 10, wherein the first frame period is prior to the second frame period, and the second settling time is determined according to the first light energy.

13. The image sensor as claimed in claim 12, further comprising:

a memory, configured to record a relationship between multiple predetermined light energy zones and multiple predetermined settling times; and a processor, configured to determine the second settling time according to the relationship.

14. The image sensor as claimed in claim 8, wherein the each pixel circuit is further configured to in an initial frame period, after a default settling time from resetting the base-emitter voltage by the reset transistor, detect pre-flash energy of the light source by the photodiode within a default pre-flash time to increase the beta of the bipolar junction transistor to a stable level, and the default settling time is longer than the first settling time, and the default pre-flash time is longer than the first pre-flash time.

15. An operating method of an image sensor, the image sensor comprising a bipolar junction transistor (BJT) pixel circuit and a light source, the operating method comprising:

resetting, using a base reset signal, a base-emitter voltage of a bipolar junction transistor of the BJT pixel circuit at a first time; and turning on, using a light source control signal, the light source for a pre-flash time at a second time to increase a beta of the bipolar junction transistor to a stable level, wherein the pre-flash time and a settling time of the base-emitter voltage between the first time and the second time are changed corresponding to light energy detected by the BJT pixel circuit.

16. The operating method as claimed in claim 15, wherein the BJT pixel circuit further comprises a shutter circuit and a storage capacitor, and the operating method further comprises:

triggering an exposure time of the BJT pixel circuit by the shutter circuit at a third time to discharge the storage capacitor, wherein the exposure time is changed with the changing of the settling time with a positive relationship.

17. The operating method as claimed in claim 15, wherein the light energy is detected by the BJT pixel circuit in an exposure time of a previous image frame.

18. The operating method as claimed in claim 17, wherein the settling time and the pre-flash time are shorter when the light energy in the previous image frame is stronger, and the settling time and the pre-flash time are longer when the light energy in the previous image frame is weaker.

19. The operating method as claimed in claim 17, wherein in the previous image frame, the BJT pixel circuit uses a default settling time of the base-emitter voltage, and the default settling time is longer than the settling time.

20. The operating method as claimed in claim 15, further comprising:

changing the settling time according to the light energy in a step manner.

* * * * *